US008827623B2

(12) United States Patent
Stelter et al.

(10) Patent No.: US 8,827,623 B2
(45) Date of Patent: Sep. 9, 2014

(54) DEVICE FOR LOADING GOODS INTO AND/OR UNLOADING GOODS FROM A LOADING SPACE, PARTICULARLY A CONTAINER

(75) Inventors: Johannes Stelter, Oestrich-Winkel (DE); Klaus Edelmann, Worms (DE); Rudolf Schäfer, Gückingen (DE); Theo Düppre, Kaiserslautern (DE); Kurt Arnold, Kaiserslautern (DE)

(73) Assignee: Wipotec Wiege- und Positioniersysteme GmbH, Kaiserslautern (DE)

( * ) Notice: Subject to any disclaimer, the term of this patent is extended or adjusted under 35 U.S.C. 154(b) by 0 days.

(21) Appl. No.: 13/821,552

(22) PCT Filed: Sep. 9, 2011

(86) PCT No.: PCT/DE2011/075216
§ 371 (c)(1),
(2), (4) Date: Aug. 6, 2013

(87) PCT Pub. No.: WO2012/048697
PCT Pub. Date: Apr. 19, 2012

(65) Prior Publication Data
US 2013/0313076 A1 Nov. 28, 2013

(30) Foreign Application Priority Data
Sep. 10, 2010 (DE) .......................... 10 2010 037 472

(51) Int. Cl.
| B65F 9/00 | (2006.01) |
| B64F 1/32 | (2006.01) |
| B65G 65/02 | (2006.01) |
| B65G 67/00 | (2006.01) |
| B65G 67/08 | (2006.01) |
| B65G 65/00 | (2006.01) |
| B65G 37/00 | (2006.01) |

(52) U.S. Cl.
CPC . *B65G 65/00* (2013.01); *B64F 1/32* (2013.01); *B65G 65/02* (2013.01); *B65G 67/00* (2013.01); *B65G 67/08* (2013.01); *B65G 37/00* (2013.01)
USPC .......... 414/395; 414/398; 414/399; 198/588; 198/812

(58) Field of Classification Search
USPC ........... 198/588, 812; 414/395, 398, 399, 400
See application file for complete search history.

(56) References Cited

U.S. PATENT DOCUMENTS 3,836,021 A   9/1974  McWilliams
3,993,204 A * 11/1976  Hummel ....................... 414/564

(Continued)

FOREIGN PATENT DOCUMENTS

DE         1211994       3/1966
DE       197 28 346 A1   1/1999

(Continued)

OTHER PUBLICATIONS

PCT, English translation of the Written Opinion of the International Searching Authority for PCT Application No. PCT/DE2011/075216 dated Apr. 16, 2013 (5 pages).

(Continued)

*Primary Examiner* — Douglas Hess
(74) *Attorney, Agent, or Firm* — The Culbertson Group, PC

(57) ABSTRACT

The invention pertains to a device for loading goods into and/or unloading goods from a loading space 25, particularly a container, with a conveyor arm 1 that features a transfer station 5, 7, 9 for receiving the goods in the region of its proximal end and a transfer station 21, 23 for delivering the goods in the region of its distal end, wherein the conveyor arm 1 features a transport section 13, 15, 17, 19, 21 for transporting the goods from the transfer station 5, 7, 9 to the transfer station 20, wherein the transfer station 20 is realized in the form of a transfer and/or removal head 21, 23 that automatically deposits the goods at a predefined position in the loading space (25) and/or automatically picks up the goods from a predefined position in the loading space (25), and wherein the conveyor arm 1 is able to continuously transport the stream of successive goods to and/or from the predefined position.

12 Claims, 2 Drawing Sheets

(56) References Cited

U.S. PATENT DOCUMENTS

| | | | |
|---|---|---|---|
| 4,425,069 A * | 1/1984 | Saur et al. | 414/398 |
| 4,643,629 A * | 2/1987 | Takahashi et al. | 414/331.17 |
| 4,815,580 A | 3/1989 | Schanz et al. | |
| 5,009,560 A * | 4/1991 | Ruder et al. | 414/392 |
| 5,088,873 A * | 2/1992 | Ruder et al. | 414/392 |
| 5,176,485 A * | 1/1993 | Ruder et al. | 414/392 |
| 5,325,953 A * | 7/1994 | Doster et al. | 198/304 |
| 5,716,184 A * | 2/1998 | Lowe et al. | 414/398 |
| 5,921,740 A * | 7/1999 | Stewart | 414/399 |
| 6,431,346 B1 * | 8/2002 | Gilmore et al. | 198/588 |
| 6,484,868 B1 * | 11/2002 | Rowe | 198/580 |
| 6,533,096 B2 * | 3/2003 | Gilmore et al. | 193/35 TE |
| 6,659,704 B2 | 12/2003 | Fukuhara et al. | |
| 7,470,099 B2 | 12/2008 | Bengtsson | |
| 7,641,043 B2 | 1/2010 | Vestergaard | |
| 7,695,235 B1 * | 4/2010 | Rallis | 414/400 |
| 7,967,543 B2 | 6/2011 | Criswell et al. | |
| 8,251,202 B2 | 8/2012 | Edelmann et al. | |
| 2006/0133913 A1 | 6/2006 | Helmner | |
| 2012/0325969 A1 | 12/2012 | Helmner | |

FOREIGN PATENT DOCUMENTS

| | | |
|---|---|---|
| EP | 2256038 B1 | 12/2012 |
| GB | 2410482 B | 1/2007 |
| WO | WO 98/51598 A1 | 11/1998 |

OTHER PUBLICATIONS

PCT, International Search Report for PCT Application No. PCT/DE2011/075216 dated Jan. 15, 2013 (9 pages).

* cited by examiner

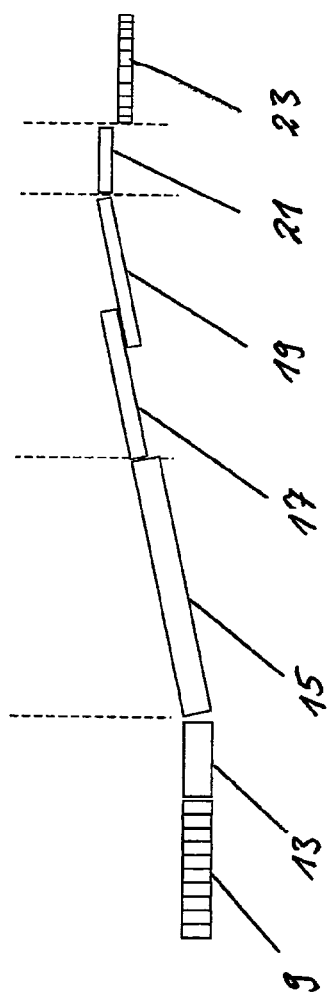

DEVICE FOR LOADING GOODS INTO AND/OR UNLOADING GOODS FROM A LOADING SPACE, PARTICULARLY A CONTAINER

TECHNICAL FIELD OF THE INVENTION

The invention pertains to a device for loading goods into and/or unloading goods from a loading space, particularly a container.

BACKGROUND OF THE INVENTION

Devices for loading and/or unloading containers are used, for example, in loading and/or unloading containers that are transported in the form of cargo on trucks, ships, trains, aircraft, etc. For example, DE 102007017288 B4 proposes a system for loading pieces of luggage into containers that can be carried along in aircraft. Such devices are also used for directly loading and/or unloading a loading space in a transport medium (train car, aircraft, ship, truck, etc.). Systems for loading and unloading a loading space of an aircraft are known, for example, from EP 1667907 B1, DE 10210575 A1 and DE 10007332 C2.

It is disadvantageous that known devices do not make it possible to transport goods to or from a loading space in a continuous, fast and reliable fashion and to selectively deposit goods in the loading space.

The invention therefore is based on the objective of developing a device that allows a continuous, fast and reliable transport of goods to and from a loading space, as well as the selective depositing of goods in the loading space.

SUMMARY OF THE INVENTION

A device according to the present invention includes a conveyor arm having a transfer and/or removal head (hereinafter referred to sometimes as a "transfer head") on the outer or distal end of the conveyor arm. This transfer head is able to automatically deliver or deposit and/or receive or pick up goods such that an active manual removal of the goods from the transfer and/or removal head by a worker is no longer required. In the context of the invention, the term automatically includes a manual, semiautomatic or even fully automatic control of the conveyor arm. Consequently, the process of positioning and/or adjusting the transfer and/or removal head into a position that can be arbitrarily specified, as well as the actual process of depositing and/or receiving an object, may by all means be handled or controlled or influenced manually by an operator, preferably by means of a console, a joystick, etc.

According to the invention, the conveyor arm transports the stream of successive goods into or from the position that can be (arbitrarily) specified along a transport section in a continuous fashion, i.e., without interruption. The stream of goods therefore is transported without being stopped, wherein separations or gaps, the size of which could not be neglected with respect to the dimensions of the goods to be transported, naturally cannot occur between conveyors or conveyor belts that adjoin one another. In this case, the transport section extends from a proximal end of the conveyor arm, at which a proximal end transfer station is located, up to the transfer head.

However, a transport technology, for example, of the type disclosed in DE 102007023909 A1, in which a gap or a separation with a size that cannot be neglected is created relative to the conveyor belt due to an extension of a loading device in relation to the object, is not considered to be continuous in accordance with the present invention because no additional object can be picked up after the extension of the loading device. Only after the depositing process is completed and the loading device subsequently is completely retracted can the stream of goods can be advanced to enable the loading device to pick up another object.

In a preferred embodiment, a conveyor arm according to the invention is realized such that it can be moved and/or pivoted laterally and/or vertically, wherein this definition also includes a motion or pivoting motion of a section of the conveyor arm. In this case, the pivoting motion may be realized at one or more points with the aid of correspondingly controllable devices (motorized, hydraulic, actuating drives or actuating linkages, lifting devices, etc.) that naturally can be adjusted into positions that can be arbitrarily specified. This advantageously makes it possible to reach all basic positions in space within a loading space by moving or pivoting the conveyor arm. Particularly in loading spaces that are not open over their entire width and/or length and the interior of which therefore is difficult to access, the inventive device still makes it possible to reach all positions on the loading space level (current loading and/or unloading level) and, according to a preferred embodiment, even all positions within the loading space through such a small opening. It would naturally also be conceivable to utilize a lifting device in order to transport the goods to a certain height. In order to achieve a continuous stream of goods without a significant gap, a lifting device of this type may be realized, for example, in the form of a retracing belt of the type described below.

In another embodiment of the invention, the lateral pivoting motion is realized in that the proximal end transfer station of the conveyor arm features a first (proximal end) rotary conveyor, for example, of the type proposed in DE 102006060303 B4 or a conveyor with variable transport direction that is spaced apart from the remainder of the conveyor arm, particularly a thin and rotatably supported disk or plate with at least one conveyor belt. In this way, a continuous stream of goods is still ensured between the non-pivoted part and the laterally pivoted section situated between the first rotary conveyor and the distal end of the conveyor arm despite a change in direction that can be (arbitrarily) specified. In this case, the first rotary conveyor may already be aligned in the direction of the further transport or may carry out fast rotary motions in relation to the speed of the stream of goods and the clearances between goods such that the stream of goods does not have to be stopped. If the diameter of the first rotary conveyor is greater than or equal to the lateral dimensions (footprint) of the goods, it would also be conceivable for the at least one conveyor belt of the first rotary conveyor to further transport a received object during a rotation.

In an advantageous embodiment of the invention, the first rotary conveyor can assume a controllable angular position during or prior to the acceptance of an object in order to allow an alignment of an individual object relative to the loading space with respect to a desired (end) position. This advantageously makes it possible to at least pre-align the object with respect to a desired end position. The at least semiautomatic luggage loading with the conveyor arm is based on the correctly positioned infeed of the piece of luggage or object such that it can be deposited in a transport container or container in the most space-saving fashion possible. Since transport containers frequently are only accessible from one side, it is with respect to the manual unloading of this transport container important that all handles and carrying aids of the deposited pieces of luggage be directed toward the open side of the transport container. The required handling points for picking up the pieces of luggage thusly are properly oriented for manual unloading. In this case, the first rotary conveyor included with the proximal end transfer station makes it possible to influence the rotational position of a piece of luggage. This device ensures that pieces of luggage are always transported along the conveyor arm in such a way that they can be deposited in the transport container along the longitudinal or lateral axis. In order to detect and correct the rotational position during the infeed of the pieces of luggage, the infeed device of the conveyor arm may be equipped, for example, with a camera system that determines the rotational position of a piece of luggage and transmits a motion command for correcting this rotational position to the first rotary conveyor included with the proximal end transfer station. In an advantageous embodiment of the invention, the camera system is also able to determine the position of handles and carrying aids on pieces of luggage. This information is used for correcting the rotational position of a piece of luggage in such a way that the desired rotational position is assumed and, for example, handles and carrying aids are always situated on the same side.

In another embodiment of the invention, the transfer and/or removal head is respectively realized in the form of a second (distal end) rotary conveyor or a conveyor with variable transport direction, particularly in the form of a thin and rotatably supported disk or plate with at least one conveyor belt. A thusly designed transfer and/or removal head makes it possible to deposit and deliver or even drop and/or accept and receive goods in and/or from all directions. As already explained above with reference to the first rotary conveyor, it would in this case also be possible for the second rotary conveyor to assume a controllable angular position during or prior to the acceptance of an object in order to allow (if applicable, after a pre-alignment) a (final) alignment of an individual object relative to the loading space with respect to a desired (end) position.

At least one of the first and/or the second rotary conveyor may be realized in the form of an altogether rotatable device with several individual belts that can be separately controlled independently of one another, wherein motions of the individual belts relative to one another make it possible to align an object lying thereon with respect to its position relative to the loading space. In this way, the alignment of an object and therefore the desired end position can also be influenced during the transport of the object and/or shortly before it is deposited or dropped by individually rotating the object on the rotary conveyor in a controlled fashion. In this context, the independent control of the individual belts includes a change of the speed, as well as a change or reversal of the moving direction (contradirectional motion) of individual belts, wherein it would also be possible to stop at least one individual belt.

It would naturally also be conceivable to equip at least one other element such as, for example, a linearly transporting conveyor element of the transport section with several individual belts that can be separately controlled independently of one another such that an element of this type also allows an alignment of the goods lying thereon in the above-described fashion.

It is expressly noted that the above-described embodiments, namely the angular position during the acceptance and/or the rotation on the rotary conveyor and/or linear conveyor element, as well as the further embodiments described below could conceivably also be used in other applications. For example, these embodiments can also be used in other systems such as transport sections in general, etc. and/or as enhancements of a transfer and/or removal head of any system for loading goods into and unloading goods from loading spaces that are transported on trucks, ships, trains, aircraft, etc. or directly introduced and used in loading spaces of such transport mediums.

In another embodiment of the invention, at least one sensor (image sensor, dimension sensor, weight sensor, camera, distance measurement by means of radio or sound, light, etc.) is arranged on the conveyor arm, particularly on the transfer and/or removal head, in order to avoid collisions with the surroundings (loading space, periphery of the conveyor arm, etc.) and/or to determine positions. In another embodiment of the invention, at least one of the depositing parameters of alignment in space, speed and final position of the object to be dropped can be at least suggestively calculated by means of the sensor. In addition to determining the position of the transfer and/or removal head in the loading space or relative to the loading space, it would naturally also be conceivable to determine parameters such as the weight or the dimensions of the object (volume or size), as well as follow-up parameters such as the drop-off curve, etc., and, if applicable, to carry out the process of depositing and/or picking up an object or to at least suggest the process (or at least one depositing parameter) to an operator in dependence on these parameters.

In such an arrangement with at least one sensor, a single or multiple measurements also make it possible to determine the position in space, i.e., the position referred to a fixed coordinate system, and the dimensions of transport containers within the work area of the conveyor arm. For example, geometric characteristics (e.g., left sidewall, right sidewall, rear wall) of a transport container or container can be scanned by means of a laser distance sensor. The position in space and the dimensions of the transport container can then be calculated from the measured data. Information on the position in space and the dimensions of a transport container makes it possible to simplify the loading process by means of corresponding control technology measures and therefore to realize the loading process in a more reliable fashion.

On the one hand, the operating range of the conveyor arm can be confined by automatically limiting the displacement range of individual motion shafts of the conveyor arm (software-based restriction of the range of motion) to the range required for the loading process. In this way, the risk of a collision with obstacles is minimized. The operator is unburdened because the respective motion shafts automatically stop when the permissible working range is exceeded. Collisions due to carelessness of the operator are therefore precluded.

On the other hand, the interpretation of the control commands of the operator can be adapted to the respective loading situation or to the preference of the operator on demand or even automatically. Two interpretation options are basically provided. The motion commands specified by the operator with the aid of corresponding input devices (e.g. joysticks) are either carried out in the machine coordinate system of the conveyor arm or in the coordinate system of a transport container. The aforementioned change-over between different coordinate systems during the conversion of the operator commands into displacement commands for the individual drive shafts also simplifies the operation with a remote and, if applicable, mobile control component or control station. In this case, the motions specified by the operator can also be converted (transformed) into an arbitrary coordinate system.

In a preferred embodiment of the invention, the conveyor arm features a section greater than or equal to one-third of the overall length, preferably more than half or more than two-thirds of the overall length, wherein said section is torsionally rigid in its longitudinal direction and cannot be laterally pivoted. This advantageously makes it possible to increase the stability of the conveyor arm in a simple fashion by preventing excessively high leverage forces from acting upon articulation devices.

It would naturally also be conceivable to realize the conveyor arm with a variable length such as, for example in the form of a so-called telescopic conveyor in this torsionally rigid section, as well as its remaining length including the transfer head, without thusly creating separations or gaps that could jeopardize a continuous stream of goods.

In a preferred embodiment of the invention, at least one scale and/or at least one dimension measuring system is integrated into the device in order to realize a determination of the depositing direction and/or the drop-off speed and/or trimming of the loading space. These systems can preferably be integrated into the acceptance point and/or the transfer station and/or the transport section.

In another embodiment of the invention, the conveyor arm features along the transport section several successive conveyor belts that adjoin one another such that their height decreases in a cascading fashion (like a waterfall) in the transport direction. In another embodiment of the invention, at least part of the transport section features a continuous conveyor belt without steps in its upper conveying region. However, the effective length of such a transport section or part thereof may still be variable, wherein the return of the belt can extend downward and/or rearward in the form of a so-called retracting belt in order to maintain the overall length of the belt constant.

The conveyor arm preferably can have an idle position at half the height (half the elevation angle) of the loading space to be loaded or to be unloaded such that a faster adaptation to a desired position (half the maximum travel) can be realized.

In another embodiment of the invention, the transfer and/or removal head may at least in the depositing or delivery direction feature a frame that protrudes over the end of the at least one conveyor belt of the transfer and/or removal head and advantageously protects the transfer and/or removal head (conveyor belts, bearings, flanges, etc.) against mechanical influences and/or can be used for pushing goods. If lateral pushing or pressing should also be possible with at least one side of the transfer and/or removal head, a corresponding frame or even a revolving frame may naturally also be provided for this side or for these sides. In another embodiment, the frame may not protrude over the end of the conveyor belt, but instead may be realized underneath the conveyor belt or the rotatably supported disk. If the transfer and/or removal head is raised accordingly, an object can also be pushed or pressed in this embodiment without the risk of damaging the at least one conveyor belt and/or the disk.

In all embodiments of the invention, the conveyor belts used may consist of top-guided belts that extend over roll axles lying in the conveyor arm plane such that their bottom belt section or return is situated in or underneath the conveyor arm. In this way, it is advantageously possible to realize the conveyor arm and the entire transport section including the transfer and/or removal head, particularly the lateral dimensions, in a small and space-saving fashion and to thusly increase the possible range of motion of the conveyor arm relative to its surroundings and an opening of the loading space.

In addition to the above-described motion and pivoting motion, the conveyor arm or at least a section thereof may be additionally realized such that it can carry out a pivoting motion in its longitudinal axis in order to also control the inclination of the transfer and/or removal head situated at a location within the loading space.

In a particularly preferred embodiment of the invention, the device is realized mobile (equipped with a traveling base, with rollers, etc.) such that the operative range, for example, for loading cargo holds of aircraft, is increased. In this context, it would also be conceivable to realize the inventive device in a self-propelled fashion, for example, in order to move the device from one site to another site by connecting the device to a mobile unit (base) in the form of an attachment or permanently integrating the device therein. The inventive device naturally may also be realized mobile in that it features wheels, rails, skids, etc., and can be pulled by another device (vehicle, winch, etc.).

So-called Mecanum wheels can be used in order to start the drives for positioning the conveyor arm (i.e., the drive of the mobile unit and/or the individual drives, servomotors, hydraulics, etc., of the conveyor arm itself) in any arbitrary direction without delay. Due to this measure, a motion can begin without having to align rollers first. In addition, Mecanum wheel drives make it possible to directly move from a respective position into any other position (omnidirectional maneuvers) such that switching is eliminated.

Although the inventive device may also be automatically controlled by means of a corresponding evaluation and control unit, it would naturally also be conceivable for a controlling operator manually to intervene in the control in a correcting or optimizing fashion. This manual intervention may consist of a direct activation of individual servo components and/or conveyor belts or a modification of data on the position of the transfer and/or removal head to be assumed in a computer-assisted fashion. It would naturally also be conceivable, for example, to interrupt the normal transport in emergency situations, to manually correct the alignment of the goods and/or the arm (direct activation of individual drives, servomotors, hydraulics, etc.) and to continue with the normal operating mode after this correction.

To this end, a control station preferably can be arranged directly on the device, particularly in the vicinity of the transfer and/or removal head, and, if applicable, moved together with the device in order to always provide an optimal view of the transfer and/or removal head.

In order to realize the actual depositing, an extendable pusher element may be arranged on the transfer and/or removal head or the transfer and/or removal head itself may be retractable underneath the conveyor arm. It would naturally also be conceivable to deposit the goods by means of partial lowering from the transfer and/or removal head and the subsequent retraction of the transfer and/or removal head while the belts continue to move. In this case, an object that already is partially deposited remains at the depositing point due to its inertia.

In another embodiment of the invention, a data storage device that can store the properties of the goods is integrated into the device in an assistant fashion, wherein data for the control can be retrieved from said data storage device.

At the transfer station, goods can be picked up by arbitrary systems or manually. It would be conceivable, in particular, to arrange a merry-go-round at the transfer station in order to further transport goods that are not required in a loop until a suitable location can be found for these goods.

In another embodiment of the invention, at least one barcode reader or scanner and/or other identification devices such as, for example, RFID transmitters and/or receivers, etc., may be integrated into the device.

In a preferred embodiment of the invention, the position of an object to be loaded and therefore its loading space relative to the device is determined, for example, optically, by means of radio or in a tactile fashion (calibration). After specifying the desired three-dimensional end position of the object (e.g. within a Cartesian coordinate system), the device is controlled in a computer-assisted fashion (activation of the drive shafts, articulations, servomotors, hydraulics, belts of goods, etc.) by means of an evaluation and control unit. An intervention by an operator is also realized, for example, by means of Cartesian coordinates without an operator being directly connected to or operating the actuating drives of the device.

The current loading status and therefore an optimal depositing point for an object can also be determined by means of suitable sensor technology and, if applicable, displayed on a graphic display. For this purpose, an object can already be detected with respect to its dimensions and parameters beforehand (for example by means of a management system) or once it is situated on the conveyor arm. After a confirmation and/or correction, this position can be approved by an operator. In this respect, it would be conceivable to display detected goods and determined depositing points on a display, on which an operator can move the object to the determined location by means of drag & drop and thusly issue the command for the system. In this case, the graphic display may feature augmented reality functions in order to provide the operator with optimal assistance by superimposing simulated image components on image components of the real scene.

During the determination of the optimal depositing point, it is naturally also possible to realize proper trimming of a loading space and therefore trimming of the transport medium (aircraft, ship, railway car, container, etc.) that contains the loading space, wherein not only the depositing point or end position of the goods is incorporated into the calculation, but naturally also their weight and, if applicable, their dimensions and/or center of gravity. For this purpose, the position within the transport container at which a piece of luggage was deposited can be calculated from the location or position of the motion shafts (as long as the position of the transport container in space was previously determined). This position information can be stored in conjunction with the identification of the respective transport container. If the weights of the loaded pieces of luggage are known, the total weight and the position of the center of gravity of the transport container can be at least approximately calculated. This information can be made available for further use (e.g. for calculating the loading sequence or trimming an aircraft). If information on the identity of the pieces of luggage is also available during the loading process, this identity information can be linked with the position information and stored. Consequently, it is possible to specify the transport container of individual pieces of luggage, as well as their position within this container, at any time.

It is preferred that the transmission of the parameters of the respective object already take place beforehand, i.e., prior to the transfer to the transport section, such that an unsuitable object is not transferred to the transport section, but rather transported further, for example, on a merry-go-round and the system can wait for the reception of the next object and its potential suitability.

In an advantageous embodiment, the alignment of an object may also be detected during the transport at arbitrary locations on the conveyor arm because a desired change of the alignment may also be realized at the transfer head.

The different embodiments of the invention advantageously make it possible to quickly and reliably transport goods to or from a loading space, particularly a container, to align the goods relative to the container and to purposefully deposit or even drop and/or pick up or receive said goods in the loading space. The inventive device can be utilized universally and for arbitrary applications and application sites. It only puts minimal demands on a local logistics environment. Due to its flexibility, the inventive device is particularly suitable for easily retrofitting or replacing existing stocking devices.

BRIEF DESCRIPTION OF THE DRAWINGS

The invention is described in greater detail below with reference to an exemplary embodiment that is illustrated in the drawings.

In these drawings:

FIG. 2 shows a schematic side view of the device according to FIG. 1.

DESCRIPTION OF ILLUSTRATIVE EMBODIMENTS

Figure 1:
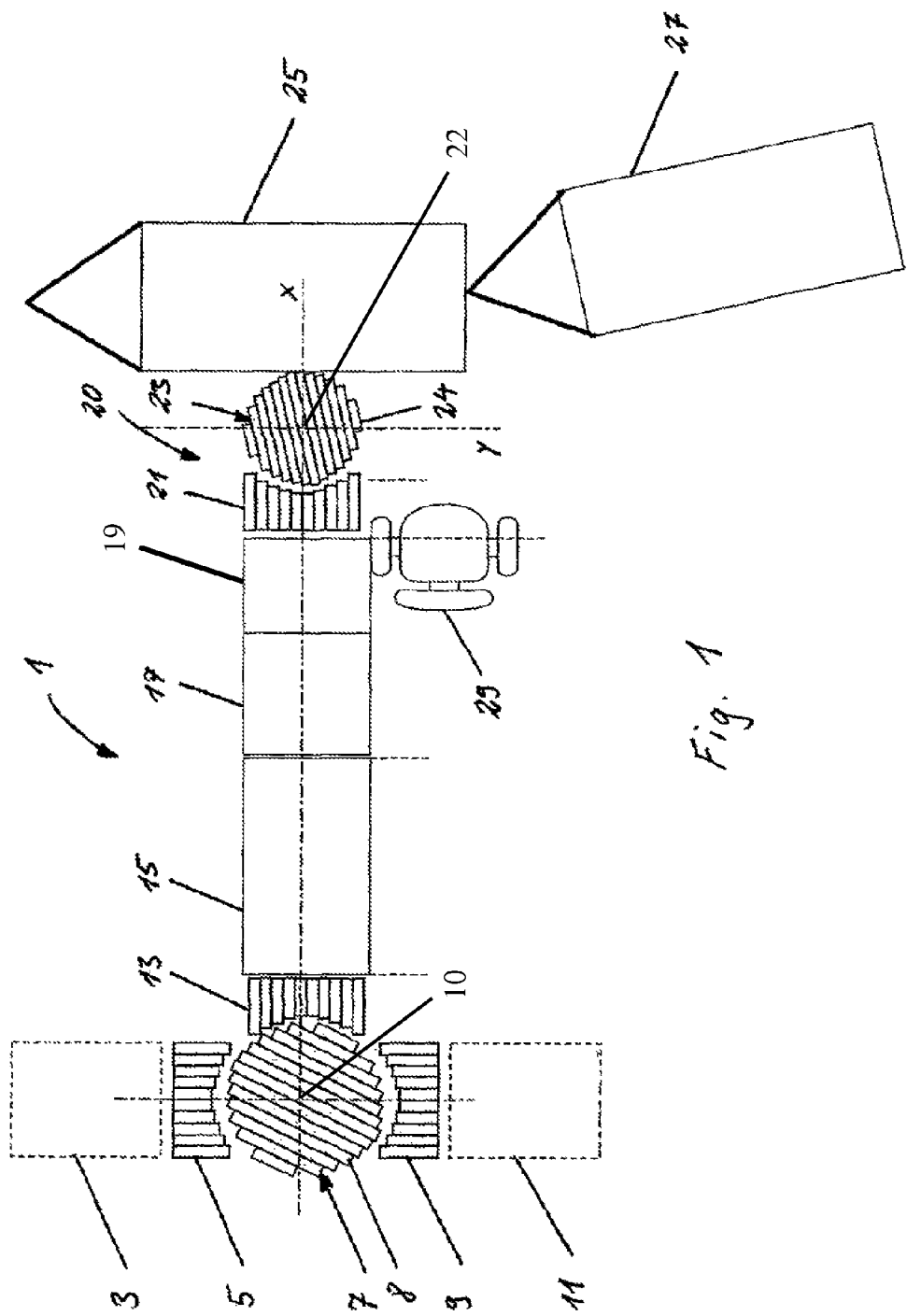
FIG. 1 shows a schematic top view of an inventive device.

According to FIG. 1, a device for loading and unloading goods comprises a conveyor arm 1 that features a transfer station (proximal end transfer station) in the form of a first rotary conveyor 7 including infeeds 5, 9, and 13 on one side (illustrated on the left side in the figure). This rotary conveyor 7 includes a disk or a thin plate that is supported rotatably about a central shaft having a rotational axis 10 extending perpendicular to the plane of projection, wherein narrow conveyor belts 8, the length of which increases toward the disk center, are arranged parallel to one another on the surface of this disk or thin plate.

Although not illustrated in greater detail, the individual conveyor belts 8 are in this case supported on their ends by means of roller axles that lie in the plane of projection such that only the upper side of the respective conveyor belts 8 is visible in FIG. 1 and the underside of the conveyor belts 8 or their return sections are respectively situated on the underside of the disk of rotary conveyor 7 or in the disk interior and therefore are not illustrated in greater detail in FIG. 1. Infeeds 5 and 9 that also feature conveyor belts extending parallel to one another as described above with reference to the rotary conveyor 7, but not rotatably supported, are arranged in the vicinity of the rotary conveyor 7 in the vertical direction in FIG. 1 and in alignment with the plane of projection.

According to FIG. 1, the infeeds 5 and 9 have reduced lengths from the outside to the center on their belt ends that face the rotary conveyor 7 such that a complement of the circular-shaped rotary conveyor 7 is formed. Another infeed 13 of the above-described design is arranged in the vertical direction and is illustrated on the right side in the drawing. According to FIG. 1, the distances between the infeeds 5, 9 and 13 and rotary conveyor 7 are also maintained small due to the aforementioned circular or complementary shape without impairing the rotatability of the rotary conveyor 7. Luggage infeeds 3 and 11 (illustrated with broken lines in the drawing) that respectively may, for example, form part of a merry-go-round or an endless loop or a correspondingly designed conveyor belt are arranged adjacent to the side of the infeeds 5 and 9 that faces away from the rotary conveyor 7.

An inclinable conveyor element 15 is arranged adjacent to the side of the infeed 13 that faces away from the rotary conveyor 7 and can be upwardly or downwardly inclined from the idle position illustrated in FIG. 2 by a predefined angle at the connecting point between the infeed 13 and the element 15, namely by means of a not-shown device such as, for example, an articulation, a servomotor, etc. A telescopic conveyor 17, 19 with a first element 17 and a second element 19 positioned thereunder in an extendable and retractable fashion is arranged adjacent to and in alignment with said element 15. On their upper side, the elements 15, 17, 19 respectively feature a conveyor belt that extends over a roll axle arranged on the ends of the elements in the plane of projection and is returned on the inner side of the elements or the underside of the elements. Due to this measure, a gap between the elements 17 and 19 is respectively prevented from forming in the conveyor belt or between one conveyor belt and the following conveyor belt in an arbitrary position of the telescopic conveyor 17, 19.

According to FIG. 2, a step that descends from the left toward the right in the drawing is at best created in this case. A transfer head 20 that is realized in the form of an infeed 21 and a rotary conveyor 23 arranged adjacent to the element 19. This rotary conveyor 23 comprises a rotatable thin disk or plate that also features conveyor belts 24 as already described above with reference to the first rotary conveyor 7. Infeed 21 has a design that corresponds to that of the above-described infeed 13 except for a mirror inversion (referred to a vertical mirror axis in FIG. 1), and is horizontally arranged between the element 19 and rotary conveyor 23. Due to this measure, it is also ensured that essentially only a small clearance exists between the infeed 21 and the rotary conveyor 23 in any position of the rotary conveyor 23 despite the rotatable support of the rotatable conveyor 23 about its central axis 22 extending perpendicular to the plane of projection.

Although absolutely no goods being transported on the conveyor arm 1 are illustrated in the drawing, the dimensions of the disk are greater than or equal to the footprint of the goods while the clearances (gap, separation) are considered to be small in comparison with the lateral and longitudinal dimensions of the goods in any position of the rotary conveyors 7 and 23 relative to their infeeds 5, 9, 13 and 21.

According to FIG. 2, the infeed 21 is coupled to the element 19 such that the infeed 21 can be upwardly and downwardly pivoted by a certain angle together with the rotary conveyor 23 about a pivoting axis extending perpendicular to the plane of projection between 19 and 21.

A control area or control station 29 is directly arranged laterally of the device in the vicinity of the transfer head 20 and is preferably moved together with the conveyor arm 1 in order to provide an unobstructed view of the transfer head 20, as well as an object lying thereon and its potential depositing point in a loading space of a trolley 25, in any location or position of the transfer station 20.

According to FIG. 1, the trolley 25 is in the loading and unloading position that can be detected, for example, by means of not-shown sensor technology (tactile, optical, etc.). In this loading and unloading position, the conveyor arm 1 has a predefined three-dimensional position relative to the loading space of the trolley 25.

As soon as the trolley 25 is completely loaded or unloaded, the next trolley 27 can be moved into its position in order to also be loaded or unloaded.

The loading process by means of the inventive device is elucidated below.

Once a depositing point for an object has been determined, preferably suggested in a computer-assisted fashion and graphically displayed, in the loading space of the trolley 25 by the operator at the station 29, preferably with the assistance of corresponding sensor technology and an evaluation and control unit, an object received by the transfer station 5, 7, 9, 13 can be transported to this depositing point with the conveyor arm 1. For this purpose, an object can already be detected with respect to its dimensions and parameters on the infeed 3, 11 or once it is situated on the conveyor arm 1 in order to suggest the corresponding depositing point in the loading space of the trolley 25.

It is preferred if the transmission of the parameters of the object already takes place beforehand (for example by means of a management system), i.e., prior to the reception on the rotary conveyor 7 or no later than on this rotary disk, such that an unsuitable object is not transported further to the infeed 13, but rather from the infeed 5 to the infeed 9 or vise versa depending on the transport direction and the system can wait for the reception of the next object and its potential suitability.

In an advantageous embodiment, the alignment of an object may also be detected during the transport at arbitrary locations on the conveyor arm 1 because a desired change of the alignment may also be realized at the transfer station 20.

When an object is received, the rotary conveyor 7 can be rotated from a (in FIG. 1 vertical) position, in which the conveyor belts 8 are aligned with the infeeds 5 and 9, into a (in the figure horizontal) position, in which the conveyor belts 8 are aligned with the infeed 13. This rotation takes place so fast (at least within the processing speed of the transported stream of goods) that the object during the transport seamlessly and continuously reaches the conveyor belts of the infeed 13 that are aligned with the conveyor belts 8 of the rotary conveyor 7 due to this rotation of the rotary conveyor 7 and the object is then further transported in the direction of the trolley 25 by these conveyor belts. If the diameter of the rotary conveyor 7 is greater than or equal to the lateral dimensions (footprint) of the object, it would also be conceivable that the conveyor belts 8 of the rotary conveyor 7 further transport a received object during a rotation.

The transport path continues in the form of the inclinable element 15 and the telescopic conveyor 17, 19 that respectively are preferably equipped with only one wide conveyor belt, wherein the object is received and further transported by the infeed 21, preferably the conveyor belts aligned with the conveyor belts 24 of the rotary conveyor 23, i.e., in the horizontal position of the rotary conveyor 23 (in the orientation of FIG. 1). Prior to depositing, the rotary conveyor 23 can be rotated by a predetermined angle quickly in comparison with the transport speed of the stream of goods while the object is situated on the disk in order to reach the desired end position in the loading space of the trolley 25 in this fashion.

In order to realize the lateral pivoting motion of the conveyor arm, the transport section 15, 17, 19 can be pivoted (upward or downward by a certain angle in FIG. 1) about the rotary conveyor 7 (preferably equidistantly and/or radially referred to its center) such that the transfer head 20 can also be controlled into a predefined position in the Y-direction.

In order to influence the alignment of an object, i.e., its orientation, the rotary conveyor 7 and/or 23 may according to FIG. 1 already assume a certain angular position instead of the position, in which it is aligned with the infeeds 5, 9 and 21, prior to the transfer such that the orientation of the object changes by exactly this angular change and the object is further transported and deposited in this position.

It would furthermore be possible for the individual conveyor belts 8, 24 of the rotary conveyors 7 and 23, respectively, to be controlled independently (with respect to their speed and/or moving direction) such that the object (itself) can be turned into a predefined desired position or alignment while it is situated or further transported on the rotary conveyors 7 and/or 23 due to a corresponding activation of said conveyor belts.

FIG. 2 indicates that the rotary conveyor 23 is arranged lower, namely at a height underneath the infeed 21, such that the rotary conveyor 23 can also be retracted underneath the infeed 21 similar to the retraction of the element 19 underneath the element 17 in a not-shown fashion. An object situated on the rotary conveyor 23 can in this case be pushed forward by the edge on the face of the infeed 21, wherein the rotary conveyor 23 could also be completely retractable underneath the infeed 21 with respect to its diameter depending on the design of the infeed 21 (in terms of its length). Lateral pushing with one side of the infeed 21 naturally would also be possible.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A conveyor arm for transferring goods along a path to or from a predefined position within a loading space, the conveyor arm including:
   (a) a proximal end transfer station at a proximal end of the conveyor arm, the proximal end transfer station for moving goods along a proximal end portion of the path;
   (b) a transfer head at a distal end of the conveyor arm, the transfer head comprising a distal end rotary conveyor which is rotatable about a vertical axis located at the center of the distal end rotary conveyor, the transfer head for automatically depositing the goods at the predefined position within the loading space or automatically picking up the goods from the predefined position in the loading space and for moving the goods along a distal end portion of the path;
   (c) a transport section located between the proximal end transfer station and the transfer head, the transport section for transporting the goods along an intermediate portion of the path between the proximal end port of the path and the distal end portion of the path; and
   (d) wherein the proximal end transfer station, the transfer head, and the transport section are operable to continuously transport a stream of the goods to or from the predefined position within the loading space.

2. The conveyor arm of claim 1 wherein the transfer head is moveable vertically with respect to the transport section.

3. The conveyor arm of claim 1 wherein the proximal end transfer station includes a proximal end rotary conveyor which is arranged to allow a lateral pivoting motion of the transport section about a central axis of rotation of the proximal end rotary conveyor.

4. The conveyor arm of claim 3 wherein at least one of the distal end rotary conveyor and the proximal end rotary conveyor is configured to assume a controllable angular position during the reception of the goods in order to allow an alignment of an individual object relative to a desired end position for the good in the loading space.

5. The conveyor arm of claim 4 wherein at least one of the distal end rotary conveyor and the proximal end rotary conveyor comprises an altogether rotatable device with a plurality of individual belts that can be separately controlled independently of one another so as to affect the alignment of an object situated thereon.

6. The conveyor arm of claim 1 wherein the distal end rotary conveyor comprises an altogether rotatable device with a plurality of individual belts that can be separately controlled independently of one another so as to affect the alignment of an object situated thereon.

7. The conveyor arm of claim 1 wherein the distal end rotary conveyor is configured to assume a controllable angular position during the reception of the goods in order to allow an alignment of an individual object relative to a desired end position for the good in the loading space.

8. The conveyor arm of claim 1 further including at least one collision avoidance or position determining sensor arranged on the transfer head.

9. The conveyor arm of claim 1 wherein at least one of orientation in space and speed and final position of an object to be deposited in the loading space can be calculated by means of a sensor positioned on the transfer head and an evaluation device.

10. The conveyor arm of claim 1 wherein the transport section includes a telescopic conveyor operable to vary the overall length of the transport section.

11. The conveyor arm of claim 1 wherein the transport section and transfer head are positionable in an idle position at half the height of the loading space.

12. The conveyor arm of claim 1 wherein the transfer head includes a frame that protrudes over the end of a conveyor belt included on the transfer head.

* * * * *